United States Patent
Wolf et al.

(10) Patent No.: US 6,865,961 B2
(45) Date of Patent: Mar. 15, 2005

(54) FORCE SENSOR

(75) Inventors: Konrad Wolf, Walzbachtal (DE); Anton Dukart, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/443,708

(22) Filed: May 22, 2003

(65) Prior Publication Data

US 2004/0000198 A1 Jan. 1, 2004

(30) Foreign Application Priority Data

Jun. 28, 2002 (DE) .......................................... 102 29 023

(51) Int. Cl.⁷ ................................................ G01L 1/12
(52) U.S. Cl. ................................................. 73/862.69
(58) Field of Search ..................... 73/862.391, 862.632, 73/862.69, 862.451

(56) References Cited

U.S. PATENT DOCUMENTS

| | | | |
|---|---|---|---|
| 4,738,325 A | 4/1988 | Bullivant et al. | |
| 5,658,227 A | * 8/1997 | Stearns | 482/96 |
| 5,971,432 A | 10/1999 | Gagnon et al. | |
| 6,129,168 A | 10/2000 | Lotito et al. | |
| 6,323,443 B1 | * 11/2001 | Aoki et al. | 177/144 |
| 6,508,114 B2 | * 1/2003 | Lawson | 73/159 |
| 6,571,647 B1 | * 6/2003 | Aoki et al. | 73/862.381 |

FOREIGN PATENT DOCUMENTS

| | | |
|---|---|---|
| EP | 0 670 239 A1 | 9/1995 |
| WO | 00/16054 | 3/2000 |

* cited by examiner

Primary Examiner—Max Noori
(74) Attorney, Agent, or Firm—Michael J. Striker

(57) ABSTRACT

A force sensor for determination of forces on a vehicle seat has a support element arranged between an upper frame and a lower frame, a force measuring cell arranged in the support element, the upper frame is a stationary part of a rail for a longitudinal or vertical adjustment, and the measuring cell is located inside the rail or on the rail.

5 Claims, 1 Drawing Sheet

FORCE SENSOR

BACKGROUND OF THE INVENTION

The present invention relates to force sensors.

More particularly it relates to a force sensor for determination of forces on a vehicle seat, which produces an electrical signal with the use of electrical or electromagnet effect, wherein the thusly produced signal corresponds to a pressing, a pulling or a bending force acting on the force sensor.

Force sensors are required in many mechanical areas and must be provided on relatively unavailable locations of devices and aggregates for an accurate determination of pulling and/or pressing forces. An electrical signal which corresponds to the force measurement must be available for further evaluating or controlling processes. In the automobile electronic systems force sensors are used, which in many instances are relatively large and relatively expensive for manufacturing.

For some important electronic systems in motor vehicles, such as for example for seatbelt restraining systems, a small and compact force sensor is however required. Force measuring screws are of special interest to be provided directly at the connecting points between the components in which the force is concentrated. For example for seat weight force measurement and its distribution which is measured at the connection to the seat, force sensors are needed which must be manufactured in great numbers and inexpensively. However, increasingly accurate, statistically measurement force sensors are required in the manufacturing and quality measuring technique.

Known sensors which have small dimensions are based mainly on the piezo-electric convertor principle and can operate only dynamically. Static force sensors are formed often as bending springs which are provided with strain gauges. These force sensors are very precise, however they are large and expensive.

Magnetoelastic sensors are based, to the contrary, on a crossductor principle which is particularly suitable for applications where at high temperatures it is necessary to operate without electronics and only a small space is available, or in accordance with the torductor principle in which the magnetic field distribution is determined contactlessly depending on force by two U-shaped cores which are turned relative to one another by 90° and provided with windings. The crossductor principle has the disadvantage in that it provides only small nominal voltages with mainly great offset, which are difficult to evaluate. Moreover these sensors can not be used or can be used with high additional expenses for movable or rotatable parts. The torductor principle allows force measurements also in rotatable parts, however, it is very distance-sensitive.

For seat weight sensing, in particular in a motor vehicle, it is necessary that the seat height does not increase and moreover an overload yield is very important. International patent document WO 00/16054 discloses a measuring pickup for movement determination in a vehicle seat, in which an elastic deformation of a support element is determined with a measuring cell, between an upper frame which surrounds the seat shell and a lower frame which is mounted on the vehicle body, in some cases via a longitudinal and high adjusting mechanism.

SUMMARY OF THE INVENTION

Accordingly, it is an object of the present invention to provide a force sensor of the above mentioned general type, which is a further improvement of the existing sensors.

More particularly, it is an object of the present invention to provide a force sensor, in particular for determination of the forces on the vehicle seat, with a supporting element provided between an upper frame and a lower frame, in which a force measuring cell is arranged.

In keeping with these objects and with others which will become apparent hereinafter, one feature of the present invention resides, briefly stated in a support element arranged between an upper frame and a lower frame; a force measuring cell arranged in said support element, said upper frame being a stationary part of a rail for a longitudinal or vertical adjustment, said measuring cell being located at a location selected from the group consisting of inside said rail and on said rail.

The important advantage of the inventive force measuring device is the arrangement of the sensor in the rail or laterally on the rail, so that for the vehicle seat only a minimal holding point increase to approximately 1 mm can be used.

It is another advantage of the force sensor in accordance with the present invention, that the total force flux can be guided through the force measuring device.

In accordance with a preferable embodiment of the present invention, the measuring cell contains at least one bending beam which, in response to the force action to be determined, influences the magnetic field in the region of the magnetic-sensitive sensor element of the measuring cell. The bending beam can be held with its end in a pot which is mounted either on the lower frame or on the rail of the upper frame, and with its another end is mounted on the rail of the upper frame of the lower frame.

The pot in accordance with a first embodiment can be mounted on the lower frame through a swivel nut and a mounting angle, and the other end of the bending beam can be mounted by a further mounting angle on the lower side or on a side wall of the rail of the upper frame. Alternatively, the pot can be mounted through a swivel nut and a further mounting angle on the lower side or a side wall of the rail of the upper frame, and the other end of the bending beam can be mounted through a mounting angle on the lower frame of the bending beam through a mounting angle of the lower frame.

The sensor element in accordance with the present invention can be composed preferably of a Hall element which is held on at least one bending beam and which can be deviated in a simple manner under the force acting on the bending beam in the field of a relatively stationarily arranged permanent magnet.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
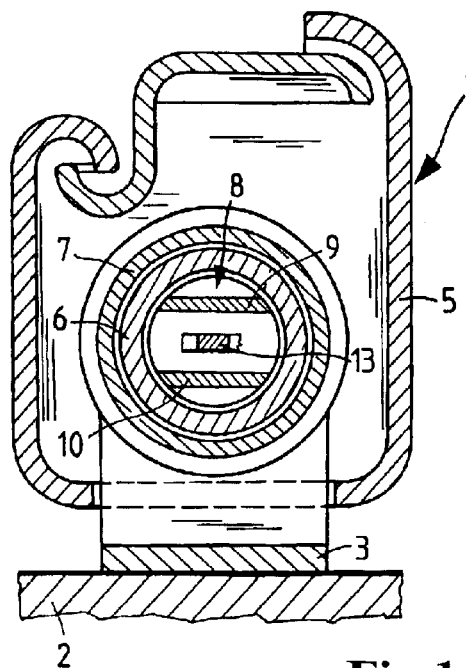
FIG. 1 is a view showing a cross-section A—A through a rail for a longitudinal displacement of a vehicle seat in a motor vehicle, with a force measuring cell.
Figure 2:
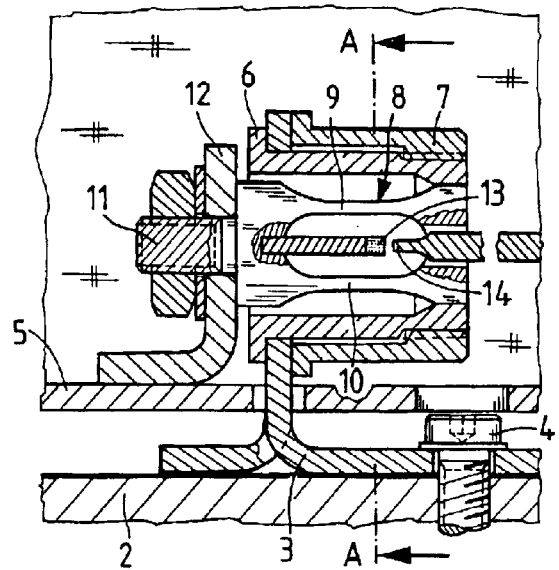
FIG. 2 is a view showing a longitudinal section through the force measuring cell shown in FIG. 1.

FIGS. 1 and 2 show a rail 1 for a longitudinal displacement of a not illustrated vehicle seat on a bottom region 2 of the motor vehicle, in two different views. A first mounting angle 3 is mounted on the bottom 2 with a bottom screw 4 and extends through a recess of the stationary lower part 5 of the rail 1.

A pot 6 is held inside the rail 1 with a swivel nut 7 on the mounting angle 3. A measuring cell 8 is accommodated in the pot 6. It contains two bending beams 9 and 10. It is held with one end in the pot 6 and is also held with the other end, through a threaded pin 11, on a further mounting angle 12 on the lower part 5 of the rail 1.

A sensor element includes a permanent magnet 13 and a Hall element 14 with a closed integrated switching circuit, which supplies an electrical outlet signal dependent on the deviation of the bending beams 9 and 10.

When in the shown embodiment a force from the vehicle seat acts on the rail 1, here in particular on the lower part 5, this force is transmitted through the further mounting angle 12 on the rail 1 to the bending beams 9 and 10. The bending beams 9 and 10 which are bending thereby lead to changing of the position of the permanent magnet 13 and the Hall element 14 relative to one another. Thereby a magnetic field change which is measurable in the Hall element 34 is produced.

Figure 3:
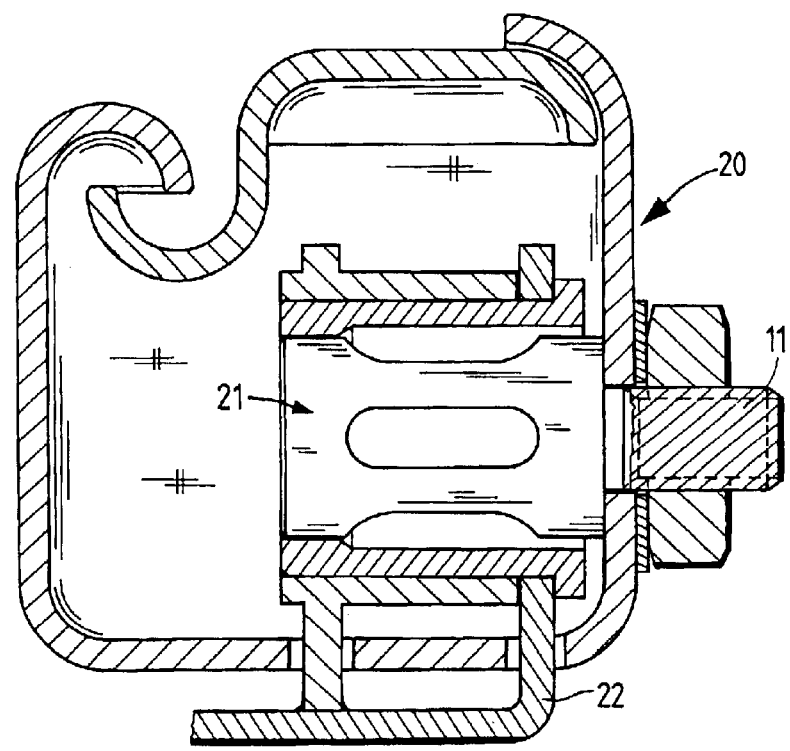
FIG. 3 is a view showing a cross-section through a rail for a longitudinal displacement of vehicle seat in a motor vehicle, with a lateral arrangement of the force measuring cell.

In the embodiment shown in FIG. 3, in contrast to the above described embodiment, a force measuring cell 21 is mounted on a rail 20 by means of a mounting angle 22 laterally on the rail 20. As for the operation of the force sensor shown in FIG. 3, its operation corresponds to the operation of the force sensor shown in FIGS. 1 and 2.

It will be understood that each of the elements described above, or two or more together, may also find a useful application in other types of constructions differing from the types described above.

While the invention has been illustrated and described as embodied in force sensor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A force sensor for determination of forces on a vehicle seat, comprising a support element arranged between an upper frame and a lower frame; a force measuring cell arranged in said support element, said upper frame being a stationary part of a rail for a longitudinal or vertical adjustment, said measuring cell being located at a location selected from the group consisting of inside said rail and on said rail, said measuring cell having at least two bending beams which, in response to a force action to be determined influence a magnetic field in a region of a magnetic-field-sensitive sensor element of said measuring cell, at least one of said bending beams having one end which is held in a pot and another end mounted on a member selected from the group consisting of said rail and said lower frame, and said pot being mounted through a swivel nut and a mounted angle on said lower frame while the other end of the bending beams is mounted by a further mounting angle on a lower side or a side wall of said rail.

2. A force sensor as defined in claim 1, wherein said pot is mounted on a member selected from a group consisting of said lower frame or said rail.

3. A force sensor determination of forces on a vehicle seat, comprising a support element arranged between an upper frame and a lower frame; a force measuring cell arranged in said support element, said upper frame being stationary part of a rail for a longitudinal or vertical adjustment, said measuring cell being located at a location selected from the group consisting of inside said rail and on said rail, said measuring cell having at least two bending beams which, in response to a force action to be determined, influence a magnetic field in a region of a magnetic-field-sensitive sensor element of said measuring cell, at least one of said bending beams having one end which is held in a pot and another end mounted on a member selected from the group consisting of said rail and said lower frame, said pot being mounted through a swivel nut and a further mounting angle on a lower side or a side wall of said rail, while another end of said bending beams is mounted through a mounting angle on said lower frame.

4. A force sensor as defined in claim 1, wherein said measuring cell has a sensor element and bending beams, said sensor element being composed of a Hall element which is held on at least one of said bending beams and is deflectable under the action of a force which acts on said bending beams in a field of a relatively stationarily arranged permanent magnet.

5. A force sensor as defined in claim 3, wherein said Hall element is provided with a closed integrated switching circuit which supplies an electrical output signal which is dependent on a deviation of said bending beams.

* * * * *